April 26, 1966     A. SANTORE     3,248,025
COMBINATION CAP AND DISPENSER
Filed Jan. 29, 1965     3 Sheets-Sheet 1

INVENTOR
ANTHONY SANTORE
BY
ATTORNEY

April 26, 1966 A. SANTORE 3,248,025
COMBINATION CAP AND DISPENSER
Filed Jan. 29, 1965 3 Sheets-Sheet 2

INVENTOR
ANTHONY SANTORE
BY Henry Sterling
ATTORNEY

April 26, 1966 A. SANTORE 3,248,025
COMBINATION CAP AND DISPENSER
Filed Jan. 29, 1965 3 Sheets-Sheet 3

INVENTOR
ANTHONY SANTORE
BY
ATTORNEY

United States Patent Office 3,248,025
Patented Apr. 26, 1966

3,248,025
COMBINATION CAP AND DISPENSER
Anthony Santore, 249 Calhoun Ave., Bronx, N.Y.
Filed Jan. 29, 1965, Ser. No. 428,896
17 Claims. (Cl. 222—484)

This is a continuation-in-part of the co-pending application Serial No. 327,002 filed November 29, 1963 now abandoned.

The present invention relates to closure devices for sealing the material evacuating apertures of containers for liquids and similar readily flowing materials, and more particularly to an improved combination cap and dispenser for such containers.

Combined caps and dispenser have been generally known but they have, in practice, been found to have many disadvantages. Thus, many of the known devices cannot be accurately regulated to insure a controlled discharge of the container to which they are applied, while others are complicated and expensive to manufacture.

Accordingly, it is an important object of the present invention to provide a combined cap and dispenser which overcomes the aforesaid disadvantages of known devices by being of simple and inexpensive construction while at the same time providing for quick and simple sealing of the container or dispensing of the liquid or similar flowable material from the container at an accurately regulated rate.

Another object of the invention is to provide a combined cap and dispenser which is especially suited for use in sealing or dispensing the contents of standard containers.

A further object of the invention is to provide a closure device of the just outlined characteristics which is constructed in such a way that not only the dispensing of liquid but also the admission of air into the container is accurately regulated.

A concomitant object of the invention is to provide a combined cap and dispenser which tightly seal the container to which it is applied and which may be quickly and easily moved to a dispensing position in which an accurately regulated evacuation of the contents of the container is accomplished.

Still another object of the invention is to provide a closure of the just outlined type in which the air admitting aperture is protected from dirt and other contaminating matter.

A still further object of the invention is to provide a closure of the above outlined characteristics which is constructed in such a way as to adapt itself to, and efficiently operate when applied to containers having wide tolerance variations.

Another object of the invention is to provide a closure of the above outlined type which may be constructed for the dispensing of liquids in the form of individual drops.

With the above objects in view, one feature of our invention resides in the provision of a combination closure and dispenser which comprises a top wall having an internal surface including an annular portion, and an annular skirt which depends from the top wall and surrounds the annular portion. The skirt is adapted to be applied around the neck of a container in such a manner as to be axially movable with respect thereto between a sealing position in which the annular portion of the internal surface in the top wall is in sealing engagement with the upper lip of the container and a dispensing position in which the annular portion of the internal surface is spaced from the lip. The closure is provided with two apertures or channels located substantially diametrically opposite each other and outside of the annular portion. The channels are arranged to communicate with the interior of the neck of the container when the skirt is moved to dispensing position so that air is admitted through one of the channels when the container is tilted sufficiently to discharge its contents through the other channel.

The novel features which are considered as characteristic of the invention are set forth in particular in the appended claims. The invention itself, however, both as to its construction and its method of operation, together with additional objects and advantages thereof, will best be understood from the following detailed description of certain specific embodiments with reference to the accompanying drawings, in which:

Figure 1:
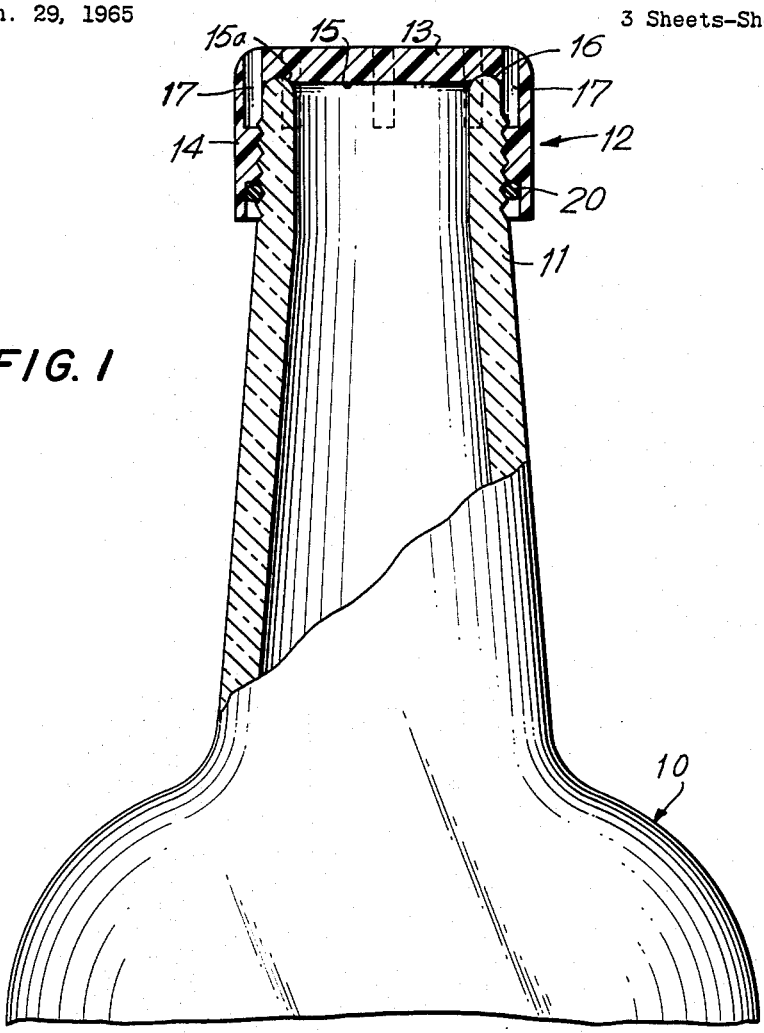
FIG. 1 is a fragmentary axial section through a container and, in sealing position thereon, a combination cap and dispenser constructed in accordance with one embodiment of the present invention.
Figure 2:
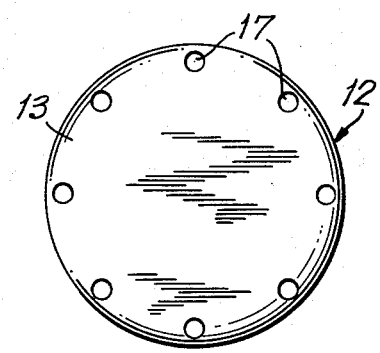
FIG. 2 is a top plan view of the cap and dispenser illustrated in FIG. 1.

Referring now in greater detail to the illustrated embodiments, and first to FIG. 1, there is shown a combination cap and dispenser 12 having a top wall 13 and a skirt 14 depending therefrom. The cap and dispenser 12, hereinafter called cap for short, is illustrated in sealing position applied to the neck 11 of a container 10. The container 10 while shown to be of glass may also be formed of metal, or similar relatively rigid material or it may consist of a deformable material such as an elastomeric synthetic plastic material. The neck 11 is externally threaded and the skirt 14 has internal threads which engage therewith. The top wall 13 of cap 12 has an internal surface 15 including an annular portion 15a which, in the sealing position shown, is in engagement with the upper lip 16 of the container 10. The cap 12 may be formed of rigid plastic material such as polystyrene or of metal. When used with a container which is itself formed of relatively rigid material, the cap 12 may consist of deformable material such as polyethelene. Thus, it is often preferred, though not absolutely essential, that at least one of the members 10 and 12 be deformable. In the illustrated embodiment, the cap 12 consists of deformable plastic material. In the illustrated sealing position, the upper lip 16 engages with and deforms the internal surface 15, to achieve a tight seal at the annular portion 15a so as to seal the contents of the container from the atmosphere. When it is desired to make both the container 10 and the cap 12 of rigid material, a conventional deformable liner may be secured to or placed against the surface 15 so as to form a reliable seal along the lip 16. Such liner may be considered to form part of the top wall 13. In the embodiment illustrated in FIGS. 1 and 2, the cap 12 is provided with a series of annularly distributed channels 17 extending axially along the internal surface of annular skirt 14 from a location intermediate the ends thereof to the internal surface 15 and then through the top wall 13. It will be noted that the channels 17 are located outside of the annular portion 15a of surface 15 which sealingly engages the lip 16 so that the contents of the container cannot escape through the channels as long as the cap 12 remains in the sealing position.

When it is desired to dispense some of, or the entire contents of the container 10, the cap 12 is slightly unscrewed from the neck 11 to move its skirt 14 axially with respect to the neck 11, and to move the annular portion 15a of the internal surface 15 away from the lip 16 to a dispensing position. In such position of the cap, the channels 17 communicate with the interior of the neck 11 so that, when the container 10 is tilted to assume a position in which the liquid level reaches or rises above at least one of the channels 17, liquid is discharged through such one of the channels, while air is admitted through one or more of the diametrically opposed channels 17. The rate of discharge and admission of air can be accurately regulated in response to axial movement of the cap 12 on the neck 11. Fine adjustment of the discharge port cross-section, as well as of the diametrically opposite air inlet port cross-section can be accomplished in response to slight movement of the cap in a direction to screw or unscrew the same from the container 10.

A further sealing element, such as an O-ring 20, may be provided between the mating threads on the neck 11 and skirt 14 if it is found necessary to prevent leakage past the threads in the dispensing position.

Such portions of the channels 17 which extend along the internal surface of the skirt 14 may, if desired, be replaced by a single annular channel (not shown) extending along the interior of the skirt adjacent the top wall 13 and communicating with all the openings in the top wall 13.

Figure 3:
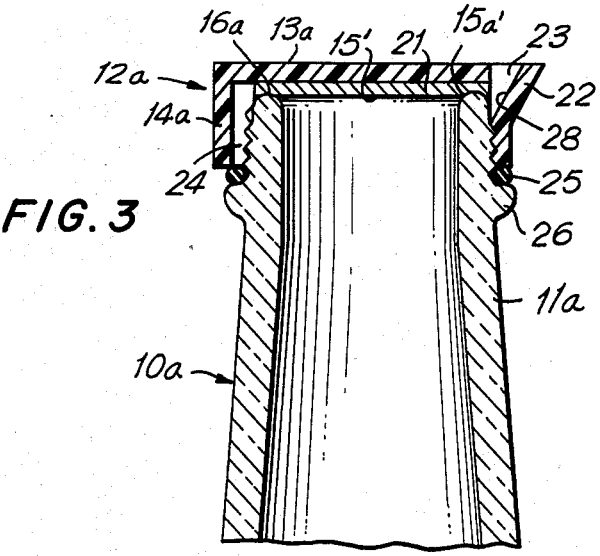
FIG. 3 is a fragmentary axial section through a container and through a modified cap and dispenser shown in sealing position.
Figure 4:
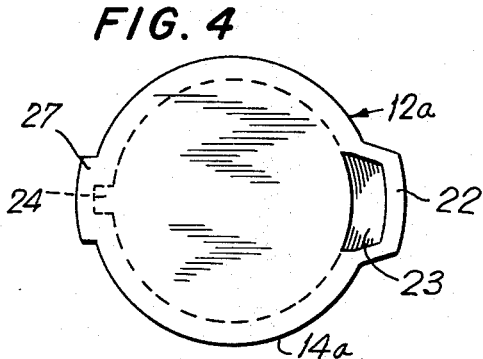
FIG. 4 is a top plan view of the combined cap and dispenser illustrated in FIG. 4.
Figure 5:
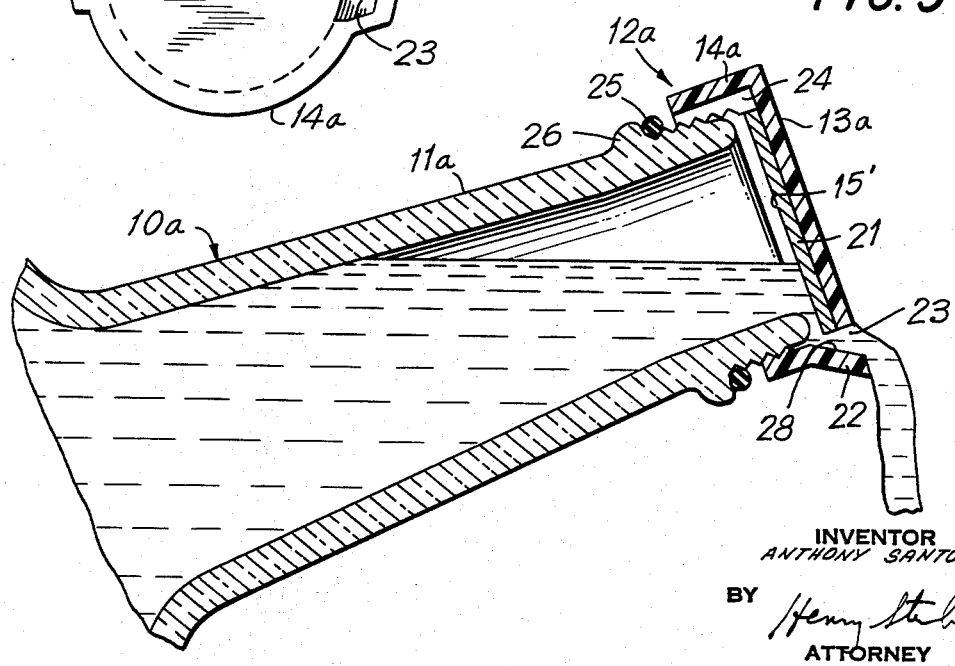
FIG. 5 shows the structure of FIG. 3 in tilted position the cap and dispenser being shown in dispensing position.

FIGS. 3, 4 and 5 illustrate a modified cap 12a which is applied to the neck 11a of a container 10a. The cap 12a is shown to have a top wall 13a and a deformable liner 21 adjacent to the internal surface of the top wall 13a. The liner 21 can be considered to form part of the top wall 13a and the internal surface 15' of liner 21 will hereinafter be referred to as being the internal surface of the top wall. A skirt 14a depends from the top wall 13a and is internally threaded to mate with the external threads of the neck 11a. In the illustrated embodiment, the cap 12a has a tapered spout 22 forming a liquid dispensing channel 23 bounded in part by a sloping wall 28. Substantially diammetrically opposite the channel 23, along the internal surface of the skirt 14a, there is provided an air admitting channel 24. As illustrated, the air admitting channel 24 preferably extends axially along the interior of skirt 14a and has an intake end spaced from and a discharge end adjacent to the top wall 13a. It will be noted that, while the channel 23 opens upwardly toward the external surface of the top wall 13a, the channel 24 opens downwardly, i.e., in a direction away from the top wall 13a and toward the container 10a. The spout 23 may equally as well be arranged to discharge liquid in a direction substantially transverse to the skirt 14a. While not shown, in such modification, the discharge channel 24 may extend, for example, radially through the skirt 14a adjacent to the top wall 13a.

The container 10a may be formed with an annular bead 26 around its neck 11a. An O-ring, or similar sealing device may be positioned above the bead 26 so as to be deformed between the open lower end of the skirt 14a and the bead 26 when the cap 12a is screwed down on the neck 11a to assume its sealing position. An O-ring, of course, may also be provided as illustrated in FIG. 1 if such additional sealing action is desired. In sealing position, the cap 12a acts as already described in relation with the embodiment of FIG. 1, the upper lip 16a of the neck 11a sealingly engages an annular portion 15a' of the internal surface 15' to thereby seal the contents of the container 10a. The channels 23, 24 are then prevented from communicating with the interior of the neck 11a.

FIG. 4 illustrates the top of the cap 12a and it will be seen that the channel 24 is preferably formed along the interior of an axially extending radial projection 27 on the skirt 14a. Such construction is preferred where the wall of the skirt 14a is too thin to be formed with an internal channel. The wall 28 in the spout 22 is inclined to prevent dripping from the spout when it is desired to stop pouring of the liquid. The inclined wall 28 facilitates the remaining drops of liquid to re-enter the container 10a through the channel 23 when the container returns to more or less upright position.

The cross-sectional area of the channel 23 is selected in such a way as to permit the maximum desired flow of liquid, while the cross-sectional area of the channel 24 is selected to provide the necessary inflow of air.

As best illustrated in FIG. 5, when the cap 12a is slightly loosened on the neck 11a to assume the dispensing position, the channels 23 and 24 communicate with the interior of the neck 11a. In such position of the cap 12a, a tilting of the container 10a, which may be, for example a bottle containing whiskey or another alcoholic beverage, to a position of inclination in which the liquid level rises to or above channel 23, causes liquid to flow out of the container 10a through the channel 23 at a rate which is accurately adjustable. Merely a slight turn of the cap 12a with respect to the neck 11a increases or reduces the effective cross-sectional area of the discharge channel 23 as well as of the air admitting channel 24. By reducing the actual cross-sectional area of the channel 24, at least in the region immediately adjacent the top wall 13a, a spurting of liquid out of channel 24, during the initial surge of liquid into the interior of the neck 11a when the bottle is first tilted, may be avoided.

The cap 12a of FIGS. 3, 4 and 5 is preferred for use in connection with containers which consist of rigid material, such as glass or rigid synthetic plastic. When applied to the neck of a rigid container, the cap 12a permits air to be sucked in, i.e., the container is vented in proportion to the outflow of liquid, thus assuring the formation of a steady uniform stream and reducing the likelihood of splashing. The aforesaid is particularly advantageous with liquor or medicine bottles whose contents are expensive so that waste should be kept to a minimum. The cap 12a is of simple and inexpensive construction and it can be directly applied to available liquor and similar bottles and containers without requiring any modifications in the configuration of such bottles or containers. Further, the cap provides a satisfactory seal for the contents of the container 10a, and, its outward appearance is not very different from the appearance of bottle tops now generally used for the purpose of sealing only.

Air channel 24 is located substantially diametrically opposite channel 23 and has intake end face facing away from the top wall 13a. Such construction permits the bottle to be tilted at least slightly beyond the angle at which the internal surface 15' is fully covered with liquid, without the possibility of any liquid escaping through the channel 24.

Figure 6:
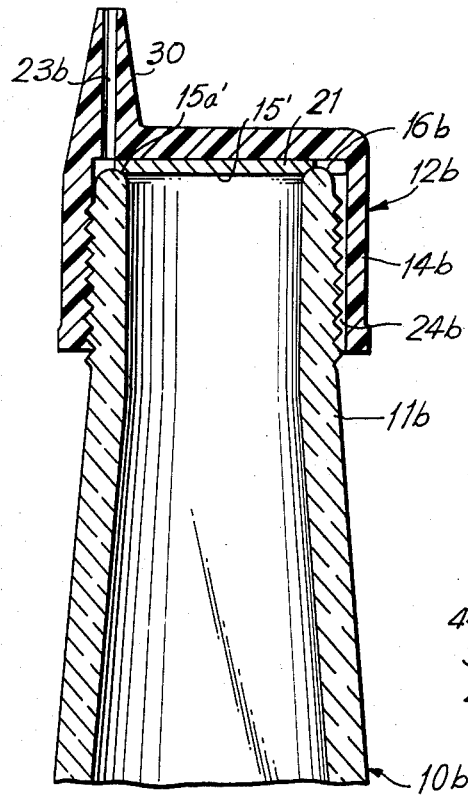
FIG. 6 is a fragmentary section through a container having attached thereto a further embodiment of the combined cap and dispenser.

FIG. 6 illustrates an embodiment of the invention which differs from the embodiment of FIG. 3 in the following respects. Cap 12b, has an elongated annular extension or spout 30 projecting outwardly, preferably axially from the top wall 13b. Extension 30 forms a passage 23b in the interior thereof and extending through the top wall 13b and along the interior of skirt 14b. Cap 12b is illustrated to have an elongated skirt 14b for even greater sealing effect. It will be obvious, however, that a shorter skirt, or one including an O-ring, or the like, may be provided as well. In the illustrated embodiment, a deformable liner 21, having an internal surface 15' cooperates with the top lip 16b to seal the container. The cap shown in FIG. 6 is particularly suitable for dispensing liquids such as medicines, for example, in drop form. A very accurate adjustment of the dispensing flow, may be obtained by providing neck 11b and skirt 14b with fine threads. The elongated passage 23b permits droplets of liquid to be dispensed at an adjustably predetermined rate. The configuration of the projecting spout 30 also permits the drops or controlled stream which is being dispensed to be accurately directed within a small area.

It will be readily seen that in all of the embodiments of the present invention the dispensing channel such as, for example, the passage 23b of the embodiment illustrated in FIG. 6, may be positioned substantially or entirely over the upper lip e.g. lip 16b of the container. The only requirement being that annular portion 15a' located radially inwardly of passage 23b engages sufficiently with upper lip 16b to form a seal therewith.

Figure 7:
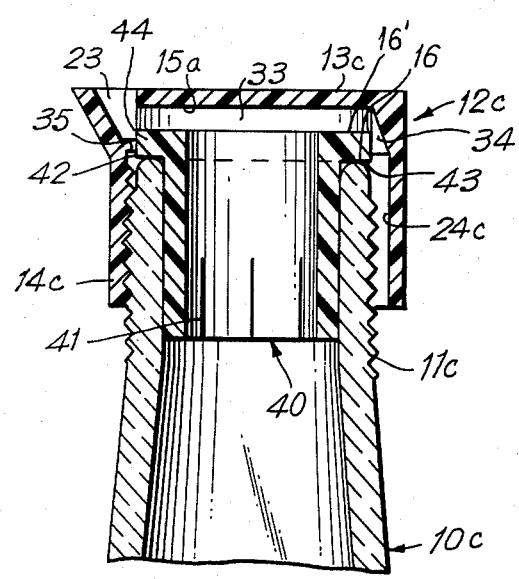
FIG. 7 is a fragmentary axial section through a container showing a two-piece combination cap and dispenser.

FIG. 7 illustrates a two-piece closure having a cap 12c and an insert 40 which cooperate to provide a sealing and dispensing action.

The embodiment illustrated in FIG. 7 is particularly useful with mass-produced bottles of rigid material such as glass, or the like, having necks 11c with threads which may have substantial tolerance variations. The threads on the necks of cheaply mass-produced bottles cannot be accurately maintained and, therefore, a cap such as illustrated in FIG. 7 which, while itself having standard dimensions, will sealingly engage the necks of all of a series of such mass-produced bottles is required. As seen in FIG. 7, insert 40, is preferably made of elastic material and has a sleeve 41 which may be slightly bowed outwardly and/or slotted axially or in any other known way constructed to provide radially outwardly directed pressure and adapted to be inserted into and to remain in position in the interior of the neck 11c of bottle 10c. Sleeve 41 has at one end thereof a radially outwardly extending shoulder 44 having a lower annular surface 43 which abuts the upper lip 16 of container 10c, an upper annular surface 16' and a peripheral portion 42 which sealingly slides within the internal surface 33 of shoulder 35 when the cap 12c is applied around the shoulder 44 of the insert and around the neck 11c of the container. In other words, the embodiment shown in FIG. 7 provides good sealing as well as spill-free dispensing action even where the dimensions of the threaded necks of the containers are not accurately maintained during their manufacture.

When in position in the neck of a bottle, as illustrated in FIG. 7, the insert 40 may be considered as forming a part of such neck. Instead of an insert 40, it will readily be seen that a bottle can be constructed so as to itself be provided with a smooth peripheral surface, above the threads thereof such as surface 42 of insert 40. Such surface being provided for the purpose of slidingly engaging the internal peripheral surface portion 33 of cap 12c, for example, and to remain in sliding engagement during movement of skirt 14c from its sealing to its dispensing position and provide a tight seal to prevent liquid from escaping between the meshing threads.

In the embodiment of FIG. 7 the dispensing position is illustrated. When the cap 12c is moved to its sealing position the top lip 16' of insert 40 sealingly engages the annular portion 15a of the internal surface 15 of top wall 13c.

Cap 12c also illustrates an optional feature which may, if desired be employed with any of the embodiments of this invention, i.e. cap 12c is shown to be provided with an air admitting channel 24c which has a tapered constricted portion 34 in the region adjacent top wall 13c. An air admitting channel having such a tapering cross-section substantially reduces the possibility of "spitting" of liquid through the channel 24c when the container is initially tilted and liquid surges forwardly into the interior of the neck. The internal annular shoulder 35 of cap 12c has an internal peripheral surface 33 which forms part of the internal surface of the skirt 14c.

Figure 8:
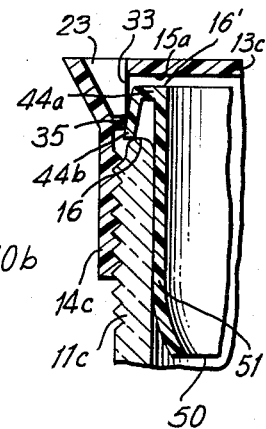

Other inserts may, of course, be provided instead of the insert 40. One differently configurated insert which has been found to be particularly advantageous is the insert 50, illustrated in FIG. 8. The latter insert which is preferably constructed of elastically deformable material, has a skirt 51 and is applied to the neck of a bottle in the same manner as described above for insert 40. A cap 12c, also as described above, is shown in FIG. 8 in dispensing position, as applied over insert 50 received in the neck 11c of a bottle. The insert 50 differs from insert 40 primarily in the configuration of the annular shoulder 44. It will be seen that similarly to insert 40, insert 50 is provided with a shoulder at one axial end of its sleeve 51. The shoulder of insert 50, however, consists of an annular projections 44a and a relatively thin, tapering annular skirt 44b spaced from and surrounding the sleeve 51. The annular skirt tapers in the direction toward the projection 44a to provide skirt 44a, at least in undeformed condition, with a frusto-conical outline. The smaller diameter end of the frusto-conically shaped skirt is connected with the annular projection 44a. The diameter of said smaller end is less than the internal diameter of the shoulder 35 of cap 12c, so that the latter may be readily applied thereover.

The larger end of skirt 44b has, however, at least in undeformed condition thereof, a diameter at least slightly exceeding the internal diameter of shoulder 35. Thus, after cap 12c has been applied over the smaller end of the skirt, further axial movement of the cap in a direction toward the sealing position thereof, causes the shoulder 35 to sealingly engage with, and to radially inwardly deform, the tapering skirt 44b. While, in FIG. 8 the cap is shown in dispensing position, it will be obvious that the aforesaid sealing action takes place not only in the dispensing but also in the sealing position of the cap 12c. A sealing action is, therefore, provided which prevents leakage of liquid not only during shipping and storage, but which also prevents leakage past the threaded connection between cap 12c and neck 11c during dispensing of the contents of the container through the spout 23. Thus, in sealing position, the sealing action at the surface 15a is supplemented by the seal provided by the tapering surface of skirt 44b, while in dispensing position, unwanted dripping is virtually eliminated also.

If it is desired to even further safeguard against any possible dripping during dispensing of the contents, the cap 12c, may be formed with an intake channel 24c having a constricted portion of rectangular cross-section (not shown), in lieu of the triangular portion 34, seen in FIG. 7. The constricted portion may be formed of such size as to effectively prevent leakage therethrough of a contained liquid having a predetermined viscosity; the aforesaid rectangular cross-section assuring a constriction of constant size at any of a series of dispensing positions, i.e., a series of axial positions of the cap.

An air intake channel 24c constricted to an air passage having a cross-sectional area of approximately 0.005 square inch, has been found particularly advantageous in preventing leakage, through the air intake channel, of liquids such as water or the like. The passage had an axial length of 0.190 inch.

It will be noted that in each of the embodiments, the threads on the cap and container may be dispensed with and replaced by any other known connecting device such as, e.g., a bayonet lock of the type which permits axial movement of predetermined magnitude of the cap along the neck, between a sealing position and a dispensing position while permitting removal of the cap in one of those positions. With such a lock the cap can be secured in each of the sealing and dispensing position by, e.g., a slightly rotary movement of the cap with respect to the neck. The latter construction is advantageous where it is desired always to have the same flow rate, that is where it is desired to have a single dispensing position.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. A container closure and dispenser for bottles and similar containers having a neck and a top lip, comprising a top wall having an internal surface including an annular portion; and an annular skirt depending from said top wall and surrounding said annular portion, said skirt being adapted to be applied around the neck of a container and being movable axially with respect thereto between a sealing position in which said annular portion is in sealing engagement with the lip and a dispensing position in which said annular portion is spaced from the lip, said closure further defining a first liquid dispensing channel and a second air-admitting channel, said channels being located outside of said annular portion substantially diametrically opposite each other, said air-admitting channel being provided in the interior of said skirt and having an intake end axially spaced from said top wall and both of said channels communicating with the interior of the neck when the skirt is moved to said dispensing position whereby said air-admitting channel will admit air when the container is tilted sufficiently to discharge its contents through said liquid-dispensing channel.

2. In a combination closure and dispenser for bottles and similar containers having a neck and a top lip, comprising a top wall having an internal surface including an annular portion; and an annular skirt depending from said top wall and surrounding said annular portion, said skirt being adapted to be applied around the neck of a container and being movable axially with respect thereto between a sealing position in which said annular portion is in sealing engagement with the lip of the container and a dispensing position in which said annular portion is spaced from the lip, said skirt further defining an internal air admitting channel having an intake end which is axially spaced from said top wall and a discharge end which communicates with the interior of the neck when the skirt is moved to said dispensing position, said discharge end being located outside of said annular portion closer to said top wall than said intake end.

3. A combination cap and dispenser for bottles and similar liquid-storing containers of the type having a neck and an upper lip, comprising a top wall having an internal surface including an annular portion; and a skirt depending from said top wall and surrounding said annular portion, said skirt having an internal surface adapted to engage the neck of a container to which said cap is applied and being axially movable with reference to the neck between a sealing position in which said annular portion sealingly engages the lip and a dispensing position in which said annular portion is spaced from the lip, said cap having a liquid-dispensing channel and an air-admitting channel located outside of said annular portion and substantially diametrically opposite each other, said air-admitting channel being provided in the internal surface of said skirt and having an intake end axially spaced from said top wall, each of said channels communicating with the interior of the neck when said skirt is moved to said dispensing position so that liquid may be dispensed when the container is tilted sufficiently to move said liquid-dispensing channel below the liquid level.

4. A cap and dispenser as set forth in claim 3, wherein said skirt comprises an internal annular shoulder adjacent to said top wall and having an internal surface for sealingly engaging a portion of the neck, said shoulder remaining in sealing engagement with the neck while said skirt is moved from sealing to dispensing position to prevent leakage of liquid along the interior of the skirt.

5. A cap and dispenser as set forth in claim 3, further comprising an elastically deformable annular sealing member provided in the interior of said skirt and adapted to sealingly engage a portion of the neck to prevent leakage of liquid between the neck and said skirt when the containers is tilted.

6. A bottle cap comprising a top wall; and an annular skirt depending from said top wall, said skirt having an internal surface provided with an axially extending channel extending in its entirety over less than the entire circumference of said internal surface and said cap having a passage extending outwardly therethough, said passage being located substantially diametrically opposite said channel.

7. A bottle cap as set forth in claim 6, wherein said skirt is provided with internal threads and said channel extends across said threads.

8. A bottle cap as set forth in claim 6, wherein said passage extends through said skirt adjacent to said top wall, said cap further comprising a spout-shaped extension projecting outwardly from said skirt adjacent to said top wall and defining a passage which communicates with said first named passage.

9. A bottle cap as set forth in claim 6, wherein said passage extends through said top wall and further comprising an elongated annular extension projecting outwardly from said top wall and surrounding a portion of said passage.

10. A bottle cap as set forth in claim 6, wherein said top wall comprises an internal annular section of elastically deformable material.

11. A composite closure, particularly for alternatively entrapping and dispensing liquids from bottles having a neck and an upper lip, comprising an annular insert of elastically deformable material having a sleeve portion arranged to be sealingly received in the neck of a bottle and a shoulder portion at one end thereof arranged to abut against the upper lip of the bottle when said sleeve portion is received in the neck; and a cap comprising a top wall and an annular skirt depending from said top wall and adapted to be applied around said shoulder portion and around the neck of a bottle in which said insert is received, said top wall being provided with an internal surface including an annular portion movable into and out of sealing engagement with said shoulder portion in response to axial displacement of the skirt between a sealing and a dispensing position, said cap further defining a liquid dispensing channel and an air admitting channel, said channels being located outside of said annular portion substantially diametrically opposite each other, said air-admitting channel extending axially along the interior of said skirt and both of said channels communicating with the interior of the insert when the skirt is moved to the dispensing position whereby the liquid may be dispensed in response to tilting of the bottle so that the dispensing channel is located below the liquid level.

12. In combination, a container for liquids, said container having a neck including an end portion of elastically deformable material; a combined cap-dispenser for said container, said cap-dispenser comprising a rigid top wall having an internal surface including an annular portion, and an annular skirt surrounding said anular portion and depending from said top wall, said skirt surrounding said neck; and retaining means for axially movably retaining said cap in engagement with said neck, said cap being movable in its entirety between a sealing position in which said end portion is deformed by and sealingly engages said annular portion and a dispensing position in which said annular portion is spaced from said end portion, said cap further defining a liquid dispensing channel and an air admitting channel located substantially diametrically opposite each other said channels being located outside of said annular section and being free to communicate with the interior of said neck when said cap is in said dispensing position, said air admitting channel extending substantially axially along the interior of said skirt and having an intake end spaced from said top wall whereby air will be admitted when the container is tilted sufficiently to discharge its contents through said dispensing channel.

13. A combination cap and dispenser for bottles and similar liquid-storing containers of the type having a neck and an upper lip, comprising a top wall having an internal surface including an annular portion of elastically deformable material; and a skirt depending from said top wall and surrounding said annular portion, said skirt having an internal surface adapted to engage the neck of a container to which said cap is applied and being axially movable with reference to the neck between a sealing position in which said annular portion is deformed by and sealingly engages the lip and a dispensing position in which said annular portion is spaced from the lip, said top wall defining a through bore and the internal surface of said skirt defining a first channel communicating with said bore and a second channel located substantially diametrically opposite the first channel and extending axially along said skirt substantially in a plane containing the axis of said annular portion, said channels communicating with the interior of the neck when said skirt is in said dispensing position so that liquid may be dispensed when the container is tilted sufficiently to move the first channel below the liquid level.

14. A combination cap and dispenser for bottles and similar liquid-storing containers of the type having a neck and an upper lip, comprising a top wall having an internal surface including an annular portion of elastically deformable material; and a skirt depending from said top wall and surrounding said annular portion, said skirt having an internal surface adapted to engage the neck of a container to which said cap is applied and being axially movable with reference to the neck between a sealing position in which said annular portion is deformed by and sealingly engages the lip and a dispensing position in which said annular portion is spaced from the lip, said top wall defining a plurality of substantially axially extending through bores annularly spaced around said top wall outside said annular portion, and the internal surface of said skirt defining a plurality of substantially axially extending channels each communicating with the respective one of said bores, each of said channels communicating with the interior of the neck when said skirt is in said dispensing position so that liquid may be dispensed when the container is tilted sufficiently to move at least one of said channels below the liquid level.

15. A combination cap and dispenser as set forth in claim 3, wherein said skirt is annular and is provided with internal threads adapted to mate with threads on the neck of the container to which the cap is applied, said air-admitting channel extending across said internal threads of said skirt and being located substantially in a plane containing the axis of said skirt and said liquid-dispensing channel extending outwardly through said cap so that liquid may be dispensed therethrough when air is admitted to the interior of the neck via said air-admitting channel.

16. A combination cap and dispenser as set forth in claim 15, wherein said skirt has a lower edge portion spaced from said top wall and said air-admitting channel extends from said lower edge portion of said skirt substantially to said top wall.

17. The combination set forth in claim 16, wherein the air-intake channel has a cross-sectional area in the region of said top wall substantially smaller than the cross-sectional area thereof in the region of said lower edge portion of said skirt.

References Cited by the Examiner

UNITED STATES PATENTS

| 2,128,128 | 8/1938 | Evans | 215—56 |
| 2,167,476 | 7/1939 | Diefenbach | 222—421 |
| 2,805,800 | 9/1957 | Malick et al. | 222—519 |
| 2,860,821 | 11/1958 | Hartung et al. | 222—519 |
| 2,953,272 | 9/1960 | Mumford et al. | 215—56 |
| 3,067,916 | 12/1962 | Lerner | 222—519 |
| 3,121,519 | 2/1964 | Cherba | 222—519 |

RAPHAEL M. LUPO, *Primary Examiner.*

CHARLES R. CARTER, *Examiner.*